United States Patent [19]

Craig

[11] Patent Number: 4,868,238
[45] Date of Patent: Sep. 19, 1989

[54] SUSPENSION POLYMERIZATION OF A VINYL MONOMER IN THE PRESENCE OF (A) CARBOXYMETHYL HYDROPHOBICALLY MODIFIED HYDROXYETHYLCELLULOSE (CMHMHEC) OR (B) CMHMHEC IN COMBINATION WITH AN ELECTROLYTE OR POLYELECTROLYTE

[75] Inventor: Daniel H. Craig, Hockessin, Del.

[73] Assignee: Aqualon Company, Wilmington, Del.

[21] Appl. No.: 137,833

[22] Filed: Dec. 23, 1987

[51] Int. Cl.$^4$ ................................................ C08J 3/02
[52] U.S. Cl. .................................... 524/457; 524/733; 524/787; 524/745; 524/788
[58] Field of Search ............... 524/457, 733, 745, 787, 524/788

[56]  References Cited
U.S. PATENT DOCUMENTS

| | | | |
|---|---|---|---|
| 2,517,577 | 12/1946 | Klug et al. | 260/231 |
| 3,183,208 | 5/1965 | Jurgeleit | 260/41 |
| 3,205,204 | 9/1965 | Heckmaier et al. | 260/87.1 |
| 3,642,733 | 2/1972 | Anderson . | |
| 3,701,742 | 10/1972 | Richardson et al. | 524/733 |
| 3,801,519 | 4/1974 | Brodof | 524/733 |
| 3,917,548 | 11/1975 | Harrington | 524/733 |
| 4,228,277 | 10/1980 | Londoll | 536/90 |
| 4,243,562 | 1/1981 | Petit | 524/733 |
| 4,352,916 | 10/1982 | Landoll | 526/200 |
| 4,612,345 | 9/1986 | Hess | 524/733 |
| 4,629,743 | 12/1986 | Hong | 521/57 |
| 4,684,704 | 8/1987 | Craig | 526/200 |

OTHER PUBLICATIONS

"Suspension Polymerization", 13 *Encyclopedia of Polymer Science and Technology*, pp. 552–571 (John Wiley & Sons, Inc., 1970).
V.2 *High Polymers*, pp. 937–949 (E. Ott et al Eds., 2nd Ed., 1954).

*Primary Examiner*—Joseph L. Schofer
*Assistant Examiner*—J. M. Reddick
*Attorney, Agent, or Firm*—Mark D. Kuller

[57] ABSTRACT

Suspension polymerization a vinyl monomer in the presence of from about 0.01 to 2.0%, by weight of the total monomer content, of a carboxymethyl hydrophobically modified water-soluble, nonionic cellulose either polymer alone or in combination with an inert electrolyte or inert polyelectrolyte is disclosed. The presence of the carboxymethyl hydrophobically modified water-soluble, nonionic cellulose ether polymer alone or in combination with an inert electrolyte or inert polyelectrolyte provides suspension polymer beads of narrower polydispersity and clarity, and results in minimal latex polymer (emulsion polymer) by-products.

21 Claims, No Drawings

SUSPENSION POLYMERIZATION OF A VINYL MONOMER IN THE PRESENCE OF (A) CARBOXYMETHYL HYDROPHOBICALLY MODIFIED HYDROXYETHYLCELLULOSE (CMHMHEC) OR (B) CMHMHEC IN COMBINATION WITH AN ELECTROLYTE OR POLYELECTROLYTE

This invention is directed to suspension polymerization of a vinyl monomer in the presence of from about 0.01 to 2.0%, by weight of the total monomer content, of a carboxymethyl hydrophobically modified water-soluble, nonionic cellulose ether polymer (stabilizer), such as carboxymethyl hydrophobically modified hydroxyethyl cellulose (CMHMHEC), alone or in combination with an inert electrolyte or inert polyelectrolyte. The presence of the stabilizer alone or in combination with an inert electrolyte or inert polyelectrolyte prevents the agglomeration of the polymer beads during polymerization, providing good yields of polymer possessing polymer beads of narrow polydispersity and superior clarity, and minimizes formation of undesirable latex polymer (emulsion polymer) by-products.

BACKGROUND OF THE INVENTION

Many commercially important polymers are produced by suspension polymerization. The basic suspension polymerization process and the problems associated therewith are well known in the art, as discussed, for example, by Landoll in U.S. Pat. No. 4,352,916.

The use of hydrophobically modified water-soluble, nonionic cellulose ether polymers, such as hydrophobically modified hydroxyethyl cellulose (HMHEC), as stabilizers in the manufacture of polymers from vinyl monomers via suspension polymerization is disclosed in U.S. Pat. No. 4,352,916, cited above. Such stabilizers prevent the agglomeration of the polymer beads formed during suspension polymerization and also, to a large extent, help determine the final bead size distribution, polydispersity, and porosity. Their molecular weight, hydrophobe substitution level, hydrophobe length and concentration strongly influence the resulting polymer bead distribution in terms of average diameter and polydispersity. The stability of the suspensions prepared using such stabilizers is excellent, but broad bead size distribution occurs. Also, significant amounts of latex by-product (emulsion polymer) are produced. Thus, there is a need to provide suspension polymer beads of narrower Polydispersity and greater clarity (reduced cloudiness or haziness in the beads due to emulsion polymer by-product adsorption onto suspension polymer beads) than those obtained by suspension polymerization in the presence of such stabilizers.

An object of the present invention is to provide an improved suspension polymerization process for preparation of good yields of polymer beads of narrow polydispersity and superior clarity.

Another objective of the present invention is to minimize the amount of the latex by-product formed in the suspension polymerization processes.

A further objective of the present invention is to provide polymer beads of narrower polydispersity and greater clarity.

Other objectives of the present invention will become obvious from the above discussion and the following description of this invention.

SUMMARY OF THE INVENTION

This invention is an improved process for the preparation of an aqueous polymer suspension wherein suspension polymerization is carried out in the presence of from about 0.01% to about 2.0%, by weight, based on the total monomer content, of a carboxymethyl hydrophobically modified water-soluble, nonionic cellulose ether polymer (stabilizer).

DETAILED DESCRIPTION OF THE INVENTION

The cellulose ether derivatives of this invention are described by Reid et al in copending U.S. patent application Ser. No. 07/097,777, filed Sept. 17, 1987, entitled "Carboxymethyl Hydrophobically Modified Hydroxyethylcellulose (CMHMHEC) And Use Of CMHMHEC In Protective Coating Compositions", assigned to the assignee of this application. Any nonionic water-soluble cellulose ether derivative can be employed as the substrate to form useful carboxymethyl hydrophobically modified cellulose ether derivatives such as those of this invention. Thus, e.g., hydroxyethyl cellulose, hydroxypropyl cellulose, methyl cellulose, hydroxypropyl methyl cellulose, ethyl hydroxyethyl cellulose, and methyl hydroxyethyl cellulose can all be modified. These cellulose ether derivatives are available commercially or can be prepared by known methods, such as by treating a cellulose furnish, e.g., wood pulp or chemical cotton, with alkylene oxide in an alkaline medium. Typically the cellulosic furnish has a D.P. from about 1300 to about 2300. The amount of nonionic substituent, such as hydroxyethyl, does not appear to be critical so long as there is sufficient amount to assure that the ether is water soluble.

The preferred modified cellulose ethers are based on hydroxyethyl cellulose substrate. The most preferred cellulose ether substrate is HEC of about 50,000 to 400,000 molecular weight. Hydroxyethyl cellulose of this molecular weight level is the most hydrophilic of the materials contemplated. It can thus be modified to a greater extent than can other water-soluble cellulose ether substrates before insolubility is achieved. Accordingly, control of the modification process and control of the properties of the modified product can be more precise with this substrate.

The long chain alkyl modifier ("hydrophobe") can be attached to the cellulose ether substrate via an ether or ester linkage. Preferred is the ether linkage as the reagents most commonly used to effect etherification are readily obtained, the reaction is similar to that commonly used for the hydroxyethylation, and the reagents are usually more easily handled than the reagents employed for modification via other linkages. The resulting linkage is also usually more resistant to further reactions.

Although the hydrophobe is referred to as a "long chain hydrocarbon group", it will be recognized that except in the case where modification is effected with an alkyl halide, it is not a simple long chain hydrocarbon group. The group is actually an alpha-hydroxyalkyl radical in the case of an epoxide or an acyl radical in the case of an acid or acyl chloride. The terminology "long chain hydrocarbon group" is used since the size and effect of the hydrocarbon portion of the modifying molecule substantially obscure any noticeable effect from the connecting group. Properties are not significantly different from those of the product modified with the simple long chain hydrocarbon group. A more complete discussion of such hydrophobically modified cellulose ether derivatives and their preparation is presented by Landoll in U.S. Pat. No. 4,228,277.

The carboxymethylation can be carried out by any known method such as those described in E. D. Klug et al. in U.S. Pat. No. 2,517,577 and at pages 937–949 of V.2 *High Polymers* (E. Ott et al. Eds., 2nd Ed. 1954).

The cellulose ethers of this invention can be prepared by modifying a cellulose furnish with the substituent groups in any order. However, the most efficient synthesis results when the cellulose furnish is hydroxyalkylated first, then hydrophobically modified, and finally carboxymethylated.

Carboxymethyl degree of substitution (C.M.D.S.) is the average number of carboxymethyl groups per anhydroglucose unit of the cellulose molecule. The hydroxyethyl molar substitution (H.E.M.S.) refers to the average number of moles of hydroxyethyl group per anhydroglucose unit of the cellulose molecule.

The preferred polymer according to this invention is a carboxymethyl hydrophobically modified hydroxyethyl cellulose having a H.E.M.S. of about 1.8 to about 5.0, most preferably about 2.5 to about 4.5, a C.M.D.S. of about 0.05 to about 1.2, most preferably about 0.1 to about 1.0, and a long chain hydrocarbon group having 8 to 25 carbon atoms, most preferably 8 to 18 carbon atoms, in an amount of about 0.1 to 4.0%, most preferably, 0.2 to 2.5%, by weight of the fully substituted HMMEC.

The preparation of the cellulose ethers of this invention is illustrated in the following preparation example, which is exemplary and not intended to be limiting.

PREPARATION EXAMPLE

This example shows preparation of a carboxymethyl hydrophobically modified hydroxyethyl cellulose per this invention and is representative of preparation of all of the cellulose ether derivatives of this invention.

Chemical cotton (17.4 g), sodium hydroxide (6.9 g, 0.173 moles), water (28 g), tert-butanol (145 g), and acetone (9 g) were charged into a 500-ml glass reactor fitted with a multiported stainless steel head and stirrer assembly. Oxygen was removed by repeated vacuum/nitrogen purge. The resulting alkali cellulose was stirred 45 minutes at 25° C. Then ethylene oxide (9.0 g, 0.204 moles) was added and the temperature raised over 30 minutes to 55° C. and held at 55° C. for 45 minutes. A second increment of ethylene oxide (13.5 g, 0.295 mole) and cetyl bromide (4.3 g, 0.0142 mole) was added and the temperature raised from 55° C. to 70° C. over 30 minutes and held at 70° C. for 45 minutes. The temperature was then raised to 95° C. and held at 95° C. for 150 minutes. The reaction was cooled to 70° C. and monochloroacetic acid (4.1 g, 0.043 mole) dissolved in 10-ml of tert-butanol was added. The temperature was held at 70° C. for 60 minutes. The mixture was then cooled to 25° C. and poured into a stainless steel beaker. Neutraliztion was accomplished by the addition of 7.8 g of 70 wt % nitric acid and 0.5 g of acetic acid to achieve a slurry pH of between 8 and 9. The slurry was filtered and washed six times with 550-ml portions of 15 wt % aqueous acetone and two times with 100% acetone. The product was dried on a rotary evaporator and 29.8 g of CMHMHEC was obtained as a fine white powder with the following analysis: H.E.M.S.=2.7, C.M.D.S.=b 0.2, wt. % $C_{16}H_{33}$=0.7 (based on the weight % of the total HMMEC).

The cellulose ether derivatives of this invention are characterized in that they have a viscosity in the range of about 5 to about 60,000 centipoise in a 1 weight % solution, using a Brookfield Synchro-Lectric Model LVF Viscometer at 6 rpm (Brookfield LVF Viscosity).

By "suspension polymerizing of a vinyl monomer", it is meant that suspension polymerization is carried out with a sufficient amount of a monomer or mixture of monomers to form an aqueous polymer suspension. The term "polymer", as used herein, is inclusive of homopolymers, copolymers, terpolymers, etc. Examples of vinyl monomers that may be used in this invention include substituted and unsubstituted styrene (e.g., styrene substituted with straight chain or branched alkyl groups such as methyl, ethyl, n-propyl, isopropyl, n-butyl, sec-butyl and tert-butyl styrenes, vinyl toluene, chlorostyrene, etc.), esters of methacrylic acid (e.g., butyl methacrylate, diethylaminoethyl methacrylate, etc.), vinyl acetate, acrylonitrile, vinyl halides (e.g., vinyl chloride, vinyl bromide, vinyl fluoride, etc.), vinylidene halides (e.g., vinylidene chloride, etc.) and combinations of the aforementioned monomers. Preferred monomers are methyl methacrylate, butyl methacrylate, vinyl chloride, vinyl acetate and styrene.

CMHMHEC is preferably present in an amount from about 0.05% to about 1%, most preferably from about 0.05% to about 0.2%, by weight based on the total monomer content. More than one type of CMHMHEC may be used as long as the total amount of CMHMHEC is within the above weight percentages. In other words, for example, 0.5% of a CMHMHEC having a H.E.M.S. of 2.0, a C.M.D.S. of 0.10 and 0.15 wt. % of a $C_{10}$ hydrophobe may be used alone, in combination with 0.5% of a second CMHMHEC, for instance, having a H.E.M.S. of 4.0, a C.M.D.S. of 1.0 and 3.5 wt. % of a $C_{20}$ hydrophobe, or as part of a plurality of CMHMHEC wherein the total amount of CMHMHEC is in the aforementioned ranges (depending on the specific embodiment).

In another embodiment of this invention, from about 0.02% to about 1%, preferably 0.05% to 0.2%, of the CMHMHEC is used in combination with from about 0.01 to about 5%, preferably 0.5% to 2.5%, inert electrolyte or about 0.02% to about 0.5%, preferably 0.1% to 0.2%, inert polyelectrolyte, all by weight of the total monomer content, in the suspension polymerization of the aforementioned monomers. The optimum level of inert electrolyte is dependent on both the hydrophobe content and carboxymethyl D.S. of the CMHMHEC. In general, the higher the hydrophobe content, the lower the optimum inert electrolyte concentration. If inert electrolyte or inert polyelectrolyte is used in too high or low a ratio with respect to the amount of CMHMHEC, coagulation will result.

An "inert electrolyte" is a substance that will provide ionic conductivity when dissolved in water or when in contact with water. Examples of inert electrolytes suitable for use in the present invention include acids, bases or salts. Suitable salts contain monovalent, divalent and trivalent cations, although those which form soluble salts with CMHMHEC are preferred. They include aluminum nitrate, aluminum sulfate, ammonium chloride, ammonium nitrate, ammonium sulfate, barium nitrate, borax, calcium chloride, calcium nitrate, calcium sulfate, diammonium phosphate, disodium phosphate, magnesium chloride, magnesium nitrate, magnesium sulfate, potassium chloride, sodium acetate, sodium carbonate, sodium chloride, sodium metaborate, sodium nitrate, sodium sulfate, trisodium phosphate, zinc chloride, zinc nitrate, zinc sulfate, etc. Soluble salts include the aforementioned ammonium, diammonium, sodium, disodium, trisodium, and potassium salts, the most preferred salt of which is sodium sulfate. Two or more inert electrolytes may be used in combination.

An "inert polyelectrolyte" is a polymeric substance, either natural or synthetic, containing ionic constituents (amphoteric, cationic or anionic). Examples of inert polyelectrolytes include water-soluble ionic polymers such as sodium carboxymethylcellulose (CMC) and carboxymethyl hydroxyethyl cellulose. Two or more inert polyelectrolytes may be used in combination provided that their charges are such that they do not nullify each others effect. Suspension polymerization techniques are well known in the art and any of the known techniques and apparatus can be employed making use of the specific stabilizer, inert electrolytes, etc., of the present invention. Suspension polymerization is described in, inter alia, U.S. Pat. No. 4,352,916, cited above.

Suspension polymerization is generally carried using an initiator soluble in the monomer phase, i.e., a non-water soluble polymerization initiator. The polymerization catalysts or initiators generally used for suspension polymerization, as describe in, for instance, U.S. Pat. No. 4,352,916, cited above, can be used with the present invention. The important criterion for initiator selection is that polymerization is only initiated in the polymer phase and not in the aqueous phase. Examples of initiators include azoisobisbutyronitrile and organic peroxides and hydroperoxides. It is suggested that initiators of least solubility in water such as lauroyl peroxide be used.

Using the technique of the invention, it is possible to prepare fairly uniform polymer particles having diameters within the range of about 100 microns to about 4 mm (number average particle diameter). Variation of particle size depends to a great extent upon the concentration of the stabilizer, i.e., CMHMHEC, and inert electrolyte or inert polyelectrolyte employed.

The invention is illustrated in the following examples, which are exemplary and not intended to be limiting, wherein parts, percentages, etc., are by weight and weight percentages are based on the total weight of the formulation, unless otherwise indicated.

EXAMPLE 1

(Invention)

A polymerization reaction was carried out in a one-liter jacketed resin kettle containing a thermometer, reflux condenser, and a nitrogen inlet, employing a six-blade (45° downward pitch) turbine agitator, with 500 g of total recipe according to the following procedure using the following suspension polymerization recipe: (1) 0.1 wt. % CMHMHEC 1 (all CMHMHECs are described in Table I); (2) 49.6 wt. % water; (3) 50.0 wt. % styrene; and (4) 0.3 wt. % benzoyl peroxide initiator (pre-dissolved in styrene), all based on the total weight of ingredients (1)–(4). First, the ingredients were charged to the kettle (One hundred (100) ppm, based on the total formulation, sodium nitrite was included to inhibit latex formation). Next, the materials in the kettle were heated at 85° C. for 6 hours at the agitator speed listed in Table II. Then, the materials in the kettle were cooled to room temperature and the beads were filtered. After filtering the suspension through VWR grade 615 filter paper, the polystyrene beads were sieved through the following screens: U.S.A. Standard 7, 10, 18, 20, 30, 35, 40, 50, 70 and 80 mesh. The weights retained on each screen were tabulated. Weight average and number average bead diameter and the corresponding ratios thereof (i.e. polydispersity) were calculated. Latex by-product was determined gravimetrically after evaporation of the filtrate.

EXAMPLE 2

(Invention)

This example was carried out in the same manner as Example 1, except the CMHMHEC concentration was 0.15%.

EXAMPLE 3

(Invention)

This example was carried out in the same manner as Example 1, except the agitator speed was 275 rpm.

EXAMPLE 4

(Invention)

This example was carried out in the same manner as Example 3.

EXAMPLE 5

(Invention)

This example was carried out in the same manner as Example 3.

EXAMPLE 6

(Invention)

This example was carried out in the same manner as Example 3, except that a double reaction charge, i.e., 1000 g total recipe, was used.

EXAMPLE 7

(Invention)

This example was carried out in the same manner as Example 1, except the agitator speed was 400 rpm.

EXAMPLE 8

(Invention)

This example was carried out in the same manner as Example 1, except CMHMHEC 2 was used instead of CMHMHEC 1.

EXAMPLE 9

(Invention)

This example was carried out in the same manner as Example 8, except the CMHMHEC concentration was 0.15%.

EXAMPLE 10

(Invention)

This example was carried out in the same manner as Example 8, except the agitator speed was 275 rpm.

EXAMPLE 11

(Invention)

This example was carried out in the same manner as Example 1, except CMHMHEC 3 was used instead of CMHMHEC 1 and the agitator speed was 325 rpm.

EXAMPLE 12

(Invention)

This example was carried out in the same manner as Example 11, except the agitator speed was 600 rpm and no (polymerization inhibitor) was used.

EXAMPLE 13

(Comparison)

This example was carried out in the same manner as Example 11, except HMHEC 1 was used in place of CMHMHEC 3.

EXAMPLE 14

(Comparison)

This example was carried out in the same manner as Example 13, except HMHEC 2 was used instead of HMHEC 1.

EXAMPLE 15

(Comparison)

This example was carried out in the same manner as Example 3, except 0.5% $Na_2SO_4$ (inert electrolyte) was dissolved in the water prior to its use in the polymerization process ("pre-dissolved in the water").

EXAMPLE 16

(Comparison)

This example was carried out in the same manner as Example 15, except the CMHMHEC concentration was 0.03 wt %.

EXAMPLE 17

(Comparison)

This example was carried out in the same manner as Example 16, except 0.1% $Na_2SO_4$ (inert electrolyte) was pre-dissolved in the water.

EXAMPLE 18

(Invention)

This example was carried out in the same manner as Example 17, except the CMHMHEC concentration was 0.05 wt. %.

EXAMPLE 19

(Invention)

This example was carried out in the same manner as Example 18, except 0.5% $Na_2SO_4$ (inert electrolyte) was pre-dissolved in the water.

EXAMPLE 20

(Invention)

This example was carried out in the same manner as Example 19, except the agitator speed was 325 rpm.

EXAMPLE 21

(Invention)

This example was carried out in the same manner as Example 20, except the CMHMHEC concentration was 0.10 wt. %.

EXAMPLE 22

(Invention)

This example was carried out in the same manner as Example 21, except the $Na_2SO_4$ (inert electrolyte) was not used.

EXAMPLE 23

(Comparison)

This example was carried out in the same manner as Example 11, except HMHEC 3 was used instead of CMHMHEC 1.

EXAMPLE 24

(Comparison)

This example was carried out in the same manner as Example 23, except 0.1% $Na_2SO_4$ (inert electrolyte) was pre-dissolved in the water.

The materials used in the examples are shown in Tables I II below. The results are shown in Tables I and II below and are discussed following the tables.

TABLE I

| Example | Hydrophobe C Length/Wt. % | CMHMHEC/ HMHEC Wt. % | CMHMHEC or HMHEC C.M.D.S. | H.E.M.S. | Agitator Rpm | Bead Diameter (mm) Wt. Ave. = Dw | Poly-dispersity Dw/Dn | % Beads Recovered | % Latex | Inhibitor | Comments |
|---|---|---|---|---|---|---|---|---|---|---|---|
| (1) CMHMHEC 1 (Invention) | C-16/1.0 | 0.10 | 0.05 | 3.5 | 225 | 0.815 | 4.0 | 96.4 | 0.43 | 100 ppm NaNO$_2$ | |
| (2) CMHMHEC 1 (Invention) | C-16/1.0 | 0.15 | 0.05 | 3.5 | 225 | 0.618 | 2.9 | 93.5 | 0.47 | 100 ppm NaNO$_2$ | |
| (3) CMHMHEC 1 (Invention) | C-16/1.0 | 0.10 | 0.05 | 3.5 | 275 | 0.666 | 2.8 | 97.8 | 0.61 | 100 ppm NaNO$_2$ | |
| (4) CMHMHEC 1 (Invention) | C-16/1.0 | 0.10 | 0.05 | 3.5 | 275 | 0.753 | 3.4 | 96.4 | 0.49 | 100 ppm NaNO$_2$ | |
| (5) CMHMHEC 1 (Invention) | C-16/1.0 | 0.10 | 0.05 | 3.5 | 275 | 0.737 | 3.5 | 96.2 | 0.31 | 100 ppm NaNO$_2$ | |
| (6) CMHMHEC 1 (Invention) | C-16/1.0 | 0.10 | 0.05 | 3.5 | 275 | 0.974 | 2.3 | 98.6 | 0.44 | 100 ppm NaNO$_2$ | double scale |
| (7) CMHMHEC 1 (Invention) | C-16/1.0 | 0.10 | 0.05 | 3.5 | 400 | 0.566 | 2.0 | 99.0 | 0.27 | 100 ppm NaNO$_2$ | |
| (8) CMHMHEC 2 (Invention) | C-16/1.1 | 0.10 | 0.3 | 3.5 | 225 | 1.17 | 5.1 | 94.7 | 0.57 | 100 ppm NaNO$_2$ | |
| (9) CMHMHEC 2 (Invention) | C-16/1.1 | 0.15 | 0.3 | 3.5 | 225 | 0.556 | 3.0 | 97.8 | 0.32 | 100 ppm NaNO$_2$ | |
| (10) CMHMHEC 2 (Invention) | C-16/1.1 | 0.10 | 0.3 | 3.5 | 275 | 0.750 | 3.9 | 97.0 | 0.30 | 100 ppm NaNO$_2$ | |
| (11) CMHMHEC 3 (Invention) | C-16/0.45 | 0.10 | 0.05 | 3.5 | 325 | 0.465 | 2.7 | 96.3 | 0.32 | 100 ppm NaNO$_2$ | |
| (12) CMHMHEC 3 (Invention) | C-16/0.45 | 0.10 | 0.05 | 3.5 | 600 | 0.357 | 2.1 | 98.9 | 0.20 | — | |
| (13) HMHEC 1 (Comparison) | C-16/0.45 | 0.10 | — | 3.5 | 325 | 0.729 | 3.6 | 96.1 | 0.36 | 100 ppm NaNO$_2$ | |
| (14) HMHEC 2 (Comparison) | C-16/0.7 | 0.10 | — | 3.5 | 325 | 0.945 | 2.0 | 98.9 | 0.75 | 100 ppm NaNO$_2$ | |

TABLE II

CMHMHEC or HMHEC and Electrolytes

| Example | Hydrophobe Wt. % | CMHMHEC/ HMHEC Wt. % | C.M.D.S. | H.E.M.S. | Agitator Rpm | Bead Diameter (mm) Wt. Ave. = $\overline{D}w$ | Poly-dispersity $\overline{D}w/\overline{D}n$ | % Beads Recovered | % Latex | Electrolyte (Wt. %) | Inhibitor |
|---|---|---|---|---|---|---|---|---|---|---|---|
| (15) CMHMHEC 1 (Comparison) | C-16/1.0 | 0.10 | 0.05 | 3.5 | 275 | Coagulated | — | — | — | 0.5% Na₂SO₄ | 100 ppm NaNO₂ |
| (16) CMHMHEC 1 (Comparison) | C-16/1.0 | 0.03 | 0.05 | 3.5 | 275 | Coagulated | — | — | — | 0.5% Na₂SO₄ | 100 ppm NaNO₂ |
| (17) CMHMHEC 1 (Comparison) | C-16/1.0 | 0.03 | 0.05 | 3.5 | 275 | Oblong Beads | — | — | — | 0.1% Na₂SO₄ | 100 ppm NaNO₂ |
| (18) CMHMHEC 1 (Invention) | C-16/1.0 | 0.05 | 0.05 | 3.5 | 275 | 1.04 | 1.8 | 97.8 | — | 0.1% Na₂SO₄ | 100 ppm NaNO₂ |
| (19) CMHMHEC 1 (Invention) | C-16/1.0 | 0.05 | 0.05 | 3.5 | 275 | 1.12 | 2.0 | 97.0 | — | 0.5% Na₂SO₄ | 100 ppm NaNO₂ |
| (20) CMHMHEC 1 (Invention) | C-16/1.0 | 0.05 | 0.05 | 3.5 | 325 | 1.0 | 1.7 | 97.7 | — | 0.5% Na₂SO₄ | 100 ppm NaNO₂ |
| (21) CMHMHEC 1 (Invention) | C-16/1.0 | 0.10 | 0.05 | 3.5 | 325 | 0.724 | 3.1 | 98.2 | — | 0.5% Na₂SO₄ | 100 ppm NaNO₂ |
| (22) CMHMHEC 1 (Invention) | C-16/1.0 | 0.10 | 0.05 | 3.5 | 325 | 0.669 | 3.1 | 98.6 | 0.4 | — | 100 ppm NaNO₂ |
| (23) HMHEC 3 (Comparison) | C-16/0.7 | 0.10 | 0.24 | 3.5 | 325 | 0.727 | 3.2 | 98.9 | 0.58 | — | 100 ppm NaNO₂ |
| (24) HMHEC 3 (Comparison) | C-16/0.7 | 0.10 | 0.24 | 3.5 | 325 | 0.742 | 3.2 | 98.7 | — | 0.1% Na₂SO₄ | 100 ppm NaNO₂ |

As can be seen from the data in Tables I and II, CMHMHEC either alone or in combination with an inert electrolyte is a useful stabilizer in suspension polymerization of vinyl monomers under a variety of conditions.

Comparison of a CMHMHEC sample, e.g., example 11, with a similar HMHEC sample, e.g., example 13, shows that the presence of carboxymethyl groups significantly lowers the average bead diameter at relatively low hydrophobe levels.

Comparison of examples 1–7 and 22 versus 18–21 illustrates the additional effect on bead diameter that the presence of small amounts of inert electrolytes (18–21) has on the average bead diameter versus CMHMHEC alone (1–7, 22). Use of electrolytes gives added control over bead size.

Examples 15–16 show that coagulation results when the ratio of inert electrolyte to CMHMHEC is too high. Oblong beads resulted for the same reason in Example 17.

Due to interference from inert electrolytes it was difficult to measure the low levels of latex in examples 18–21. A visual assessment indicated lower levels of latex by-product compared with examples 1–7 and 22. This, without intending to be limited, is believed to be due to the inert electrolyte reducing the solubility of initiator in the aqueous phase, suppressing any spurious emulsion polymerization, which is the cause of latex formation.

In general, the behavior of CMHMHEC differs from previous HMHEC polymers in that greater control over polymer size (lower average polymer bead diameters with relatively low hydrophobe polymers) and greater control over bead size distributions (with relatively low hydrophobe level polymers) is obtained, particularly at low agitation rates. Thus, the behavior of CMHMHEC of a given hydrophobe content is similar to that of HMHEC of a higher hydrophobe content. This is advantageous since it is possible to supplement the more expensive and difficult hydrophobe alkylation reaction with that of the less expensive and more straight-forward carboxymethylation reaction while maintaining constant suspension polymerization procedures.

While the invention has been described with respect to specific embodiments, it should be understood that they are not intended to be limiting and that many variations and modifications are possible without departing from the scope of the invention.

What I claim is:

1. A process for the preparation of an aqueous polymer suspension comprising suspension polymerizing a vinyl monomer in the presence of from about 0.01 to about 2.0%, by weight of the total monomer content, of carboxymethyl hydrophobically modified hydroxyethyl cellulose.

2. The process of claim 1 wherein the carboxymethyl hydrophobically modified hydroxyethyl cellulose is a water-soluble hydroxyethyl cellulose polymer hydrophobically modified with a long chain hydrocarbon group having 8 to 25 carbon atoms in an amount from about 0.10 to about 4.0%, by weight of the total cellulose polymer, having a hydroxyethyl molar substitution of from about 1.8 to about 5.0 and a carboxymethyl degree of substitution of from about 0.05 to about 1.2.

3. The process of claim 2 wherein the carboxymethyl hydrophobically modified hydroxyethyl cellulose has a Brookfield LVF Viscosity of about 5 to about 60,000 centipoise in a 1 weight % solution at 6 rpm.

4. The process of claim 3 wherein the hydroxyethyl molar substitution is from about 2.5 to about 4.5 and the carboxymethyl degree of substitution is about 0.1 to about 1.2.

5. The process of claim 4 wherein the long-chain hydrocarbon group has 8 to 18 carbon atoms and is present in an amount of about 0.2 to 2.5%.

6. The process of claim 3 wherein the long chain hydrocarbon group is attached to the cellulose ether substrate of the carboxymethyl hydrophobically modified hydroxyethyl cellulose polymer via an ether or ester linkage.

7. The process of claim 5 wherein the long chain hydrocarbon group is attached to the cellulose ether substrate of the carboxymethyl hydrophobically modified hydroxyethyl cellulose polymer via an ether linkage.

8. The process of claim 3 wherein the vinyl monomer is selected from the group consisting of substituted and unsubstituted styrene, esters of methacrylic acid, vinyl acetate, acrylonitrile, vinyl halides and vinylidene halides.

9. The process of claim 6 wherein the vinyl monomer is selected from the group consisting of methyl, ethyl, n-propyl, isopropyl, n-butyl, sec-butyl and tert-butyl substituted styrene; vinyl toluene; chlorostyrene; butyl methacrylate; diethylaminoethyl methacrylate; vinyl acetate; acrylonitrile; vinyl chloride; vinyl bromide; vinyl fluoride; and vinylidene chloride.

10. The process of claim 6 wherein the vinyl monomer is selected from the group consisting of methyl methacrylate, butyl methacrylate, vinyl chloride, vinyl acetate and styrene.

11. The process of claim 7 wherein the vinyl monomer is styrene.

12. The process of claim 8 wherein the carboxymethyl hydrophobically modified hydroxyethyl cellulose is present in an amount from about 0.05% to about 1%.

13. The process of claim 10 wherein the carboxymethyl hydrophobically modified hydroxyethyl cellulose is present in an amount from about 0.05% to about 0.2%.

14. The process of claim 1 wherein the suspension polymerizing is carried out in the presence of (a) about 0.02% to about 1% of the carboxymethyl hydrophobically modified hydroxyethyl cellulose and (b) about 0.01 to about 5% of an inert electrolyte or about 0.02 to about 0.5% inert polyelectrolyte, all by weight of the total monomer content.

15. The process of claim 9 wherein the suspension polymerizing is carried out in the presence of 0.05% to 0.2% of the carboxymethyl hydrophobically modified hydroxyethyl cellulose and 0.5 to 2.5% of an inert electrolyte, both by weight of the total monomer content.

16. The process of claim 9 wherein the suspension polymerizing is carried out in the presence of 0.05% to 0.2% of the carboxymethyl hydrophobically modified hydroxyethyl cellulose and 0.1 to 0.2% of an inert polyelectrolyte, all by weight of the total monomer content.

17. The process of claim 14 wherein the inert electrolyte is selected from the group consisting of ammonium chloride, ammonium nitrate, ammonium sulfate, diammonium phosphate, disodium phosphate, potassium chloride, sodium acetate, sodium carbonate, sodium chloride, sodium metaborate, sodium nitrate, sodium sulfate and trisodium phosphate.

18. The process of claim 15 wherein the inert electrolyte is selected from the group consisting of aluminum nitrate, aluminum sulfate, ammonium chloride, ammonium nitrate, ammonium sulfate, barium nitrate, borax, calcium chloride, calcium nitrate, calcium sulfate, diammonium phosphate, disodium phosphate, magnesium chloride, magnesium nitrate, magnesium sulfate, potassium chloride, sodium acetate, sodium carbonate, sodium chloride, sodium metaborate, sodium nitrate, sodium sulfate, trisodium phosphate, zinc chloride, zinc nitrate and zinc sulfate.

19. The process of claim 15 wherein the inert electrolyte is sodium sulfate.

20. The process of claim 16 wherein the inert polyelectrolyte is selected from the group consisting of sodium carboxymethyl cellulose and carboxymethyl hydroxyethyl cellulose.

21. The process of claim 6 wherein the suspension polymerization is carried out with a monomer soluble initiator.

* * * * *

UNITED STATES PATENT AND TRADEMARK OFFICE
CERTIFICATE OF CORRECTION

PATENT NO. : 4,868,238             Page 1 of 3

DATED : SEPTEMBER 19, 1989

INVENTOR(S) : CRAIG

It is certified that error appears in the above-identified patent and that said Letters Patent is hereby corrected as shown below:

On the title page:

[56]    References Cited:

"4,228,277  10/1980    Londoll    536/90"    should read

--4,228,277  10/1980    Landoll    536/90--

[57]    Abstract, Line 1:

"polymerization"    should read    --polymerization of--

[57]    Abstract, Line 5:

"either"    should read    --ether--

Column 1, Line 50

"Polydispersity"    should read    --polydispersity--

UNITED STATES PATENT AND TRADEMARK OFFICE
CERTIFICATE OF CORRECTION

PATENT NO.    :    4,868,238

DATED         :    SEPTEMBER 19, 1989

INVENTOR(S)   :    CRAIG

It is certified that error appears in the above-identified patent and that said Letters Patent is hereby corrected as shown below:

Column 3, Line 58,59

"Neutraliztion"   should read   --Neutralization--

Column 3, Line 66

"C.M.D.S.=b 0.2,"   should read   --C.M.D.S.=0.2,--

Column 7, Line 7

"no (polymerization..."   should read

--no $NaNO_2$ (polymerization.....--.

UNITED STATES PATENT AND TRADEMARK OFFICE
CERTIFICATE OF CORRECTION

PATENT NO. : 4,868,238

DATED : SEPTEMBER 19, 1989

INVENTOR(S) : CRAIG

It is certified that error appears in the above-identified patent and that said Letters Patent is hereby corrected as shown below:

Column 5, Line 26

"as describe in" should read --as described in--

Column 8, Line 46

"Tables I II" should read --Tables I and II--.

Signed and Sealed this

Twenty-eighth Day of August, 1990

Attest:

HARRY F. MANBECK, JR.

Attesting Officer

Commissioner of Patents and Trademarks